United States Patent
Kang et al.

(10) Patent No.: US 7,549,918 B2
(45) Date of Patent: Jun. 23, 2009

(54) GOLF GAME SYSTEM AND METHOD THEREOF

(75) Inventors: In Ho Kang, Seoul (KR); Sung Jun Cho, Seoul (KR)

(73) Assignee: NHN Corporation (KR)

( * ) Notice: Subject to any disclaimer, the term of this patent is extended or adjusted under 35 U.S.C. 154(b) by 159 days.

(21) Appl. No.: 11/514,415

(22) Filed: Sep. 1, 2006

(65) Prior Publication Data
US 2007/0060230 A1  Mar. 15, 2007

Related U.S. Application Data

(63) Continuation of application No. PCT/KR2005/000613, filed on Mar. 4, 2005.

(30) Foreign Application Priority Data
Mar. 4, 2004  (KR) .................... 10-2004-0014672

(51) Int. Cl.
*A63F 9/24* (2006.01)
*A63F 13/00* (2006.01)
(52) U.S. Cl. .................... 463/3; 463/2; 463/4; 463/23; 463/36; 463/37
(58) Field of Classification Search ............. 463/2–4, 463/23, 36–37
See application file for complete search history.

(56) References Cited

U.S. PATENT DOCUMENTS

| 5,435,554 | A * | 7/1995 | Lipson | 463/3 |
| 6,217,444 | B1 * | 4/2001 | Kataoka et al. | 463/3 |
| 6,394,896 | B2 * | 5/2002 | Sugimoto | 463/3 |

(Continued)

FOREIGN PATENT DOCUMENTS

JP  2001-190836  7/2001

(Continued)

OTHER PUBLICATIONS

"Forget the Driver! Tee Off with a Mouse", Family Computing, Mar. 1994, vol. 5 Issue 3.*

(Continued)

*Primary Examiner*—John M Hotaling, II
*Assistant Examiner*—Steven J. Hylinski
(74) *Attorney, Agent, or Firm*—Knobbe, Martens, Olson & Bear, LLP

(57) ABSTRACT

A system and method for playing a golf game. A user is allotted with an ability value for the golf game, and a plurality of available golf clubs are provided according to the user's ability value. A request ability value referred to when requesting to use a corresponding golf club and an application ability value applied when the golf club is used are allotted to each of the golf clubs. Only when the user's ability value satisfies the request ability value allotted to a golf club can the user use the golf club. Ability points that can adjust the user's ability value are allotted to the user according to a result of the golf game, so that the user can select from a wide range of golf clubs having various characteristics. Accordingly, the user can adjust the ability value which influences the percentage of winning the golf game using the ability points allotted according to the result of the golf game, thereby enhancing the fun of the golf game.

19 Claims, 12 Drawing Sheets

U.S. PATENT DOCUMENTS

| | | | |
|---|---|---|---|
| 6,468,155 | B1* | 10/2002 | Zucker et al. ............... 463/23 |
| 6,626,756 | B2* | 9/2003 | Sugimoto .................... 463/4 |
| 6,881,149 | B2* | 4/2005 | Hasebe et al. ............... 463/43 |
| 7,223,169 | B2* | 5/2007 | Imaeda et al. ............... 463/3 |
| 7,270,601 | B2* | 9/2007 | Takahashi et al. ........... 463/3 |
| 7,297,056 | B2* | 11/2007 | Takahashi et al. ........... 463/3 |
| 2001/0011035 | A1* | 8/2001 | Sugimoto .................... 463/3 |

FOREIGN PATENT DOCUMENTS

| | | |
|---|---|---|
| JP | 2003-071131 | 3/2003 |
| JP | 2003-154164 | 5/2003 |
| KR | 10-2002-0019310 A | 3/2002 |

OTHER PUBLICATIONS

"Tiger Woods PGA Tour 2004 Review", by Ryan Davis, Sep. 23, 2003.*

Game FAQs "Tiger Woods PGA Tour 2003 (XBOX) Instruction Manual for PC", copyright 2002. Release date of Tiger Woods 2003 for PC is Oct. 31, 2002.*

"Tiger Woods PGA Tour 2004 Instruction Manual for Xbox", Copyright 2003. Release date of Tiger Woods 2004 for Xbox is Sep. 22, 2003.*

"Tiger Woods PGA Tour 2004 Xbox review", Sep. 24, 2003, by Sal Accardo.*

"Tiger Woods PGA Tour 2004 for Xbox Screen shot 19 of 60", used to provide evidence of the features disclosed in the "Tiger WOods 2004 for Xbox" instruction manual reference. Uploaded to IGN.com on Aug. 19, 2003.*

"GameFAQs: Tiger Woods PGA Tour 2004 (XBOX) FAQ by blackwidow26", from www.gamefaqs.com/console/xbox/file/914791/26342, last updated Jan. 11, 2004.*

International Search Report and Written Opinion of ISA dated Jul. 12, 2005 for PCT/KR2005/000613 filed on March 4, 2005.

Mario Golf 64, Nintendo, Aug. 10, 1999 in 5 pages.

Mario Golf 64, Nintendo, Aug. 11, 1999 in 5 pages.

Mario Golf GB, Nintendo, Sep. 25, 1999 in 17 pages.

Mario Golf GB, Nintendo, 1999, in 22 pages.

* cited by examiner

FIG.2

| Application ability value | Type of golf club | Flight distance | — 131 |

<Flight distance application table>

| Application ability value | Speed of swing gauge | Angle of impact | — 132 |

<Swing safety application table>

| Application ability value | Type of golf club | Impact zone adjustment value | — 133 |

<Swing accuracy application table>

| Application ability value | Additional impact zone adjustment value | Additional impact zone adjustment value | — 134 |

<Crisis management application table>

GOLF GAME SYSTEM AND METHOD THEREOF

CROSS-REFERENCE TO RELATED APPLICATIONS

This application is a continuation of PCT/KR2005/000613, filed Mar. 4, 2005, which claims the benefit of Korean Patent Application No. 10-2004-0014672 filed Mar. 4, 2004. The disclosures of these prior applications are considered part of, and are incorporated by reference herein, the disclosure of this application.

BACKGROUND OF THE INVENTION (a) Field of the Invention

The present invention relates generally to a game system and method thereof, and more particularly to a golf system and method thereof.

(b) Description of the Related Art

With the development and spread of communication networks, the Internet user population has been rapidly increasing, and a variety of web contents such as electronic commercial transactions, portals, games, etc. are being provided in line with the growth of the Internet.

Online games played over the Internet are becoming more popular day by day with a focus on the younger generation. Such online games may include arcade games, role-playing games, strategic simulation games, shooting games, sports games such as car racing games and golf games, adventure games, and so on.

Among these games, the golf game in particular has traditionally been considered as exclusive to the upper class. However, nowadays, the golf game is becoming popular among the lower class due to steady extension. Thus, an increasing number of web sites provide online golf games.

In the conventional online golf game, a golf course is displayed on a two- or three-dimensional screen, a golf club is selected, and power (flight distance), ball direction, ball rotation (hook, slice, etc.), etc., are adjusted to determine the final position of the ball. Recently, golf games are being modeled on actual golf courses, and thus provide users acquainted with the game to feel a sense of intimacy while enabling users unacquainted with but interested in golf to learn about the game (e.g. the position of hazards such as bunkers, how to master the green, etc.)

However, the conventional online golf game has a disadvantage in that it is dependent upon manipulation of keys (or a mouse) alone and is independent of the actual golfing ability of the user, and thus the game becomes dull.

In order to enhance the enjoyment of the game, varying a length of a power gauge for regulating a shot has been proposed. This proposal is disclosed in Japanese Patent Application Publication No. 2003-71131, in which the length of the power gauge is varied according to turf, weather, number of strokes, handicap, bunker, rough, and so on. However, this proposal has the drawback that, while taking into account surrounding circumstances, the game still does not reflect the ability of the user.

SUMMARY OF THE INVENTION

A system for playing a golf game according to the present invention is adapted to reflect the user's ability to play the golf game, aside from the user's skill at key manipulation, thereby further promoting enjoyment of the golf game.

In particular, the present invention is adapted to differentiate golf clubs available according to the ability of the user, and differentially assign to each golf club an application value that determines the direction, distance, etc., of a golf ball shot using the golf club, thereby promoting enjoyment of the golf game through a more various selection of golf clubs.

Further, the present invention is adapted to increase the application value of a golf club according to the selection of the user, thereby further enhancing the fun of the golf game.

According to an aspect of the present invention, a method for playing a golf game is provided, including the acts of allotting to a user an ability value, allowing the user to select a golf club set based on the ability value allotted to the user, determining an input parameter adjustment value according to an application ability value allotted to the selected golf club set, adjusting an input parameter according to the input parameter adjustment value, and performing the golf game by determining a flight distance and location of a golf ball in response to receiving a user's input corresponding to the adjusted input parameter.

According to another aspect of the present invention, a system for playing a golf game is provided, including a golf club database storing a request ability value for each of a plurality of golf club sets, and an application ability value to be applied when using a golf club, a golf club selector providing a golf club set to a user according to an ability value of the user and the request ability value of the golf club set selected by the user, an ability value determiner determining a swing gauge adjustment value according to the application ability value of the golf club set provided to the user, an ability value applier adjusting a swing gauge according to the swing gauge adjustment value, and a shot processor performing the golf game, when the user manipulates the swing gauge.

According to yet another aspect of the present invention, a recording medium storing a program is provided, which includes a function of allotting to a user an ability value, a function of providing a golf club set on the basis of the ability value allotted to the user, a function of determining a swing gauge adjustment value according to an application ability value allotted to the golf club set, a function of adjusting a swing gauge according to the swing gauge adjustment value, and a function of performing the golf game by, when the user manipulates the swing gauge, moving the golf ball in the movement direction determined according to the manipulation of the swing gauge and on the basis of the flight distance according to the user's ability value.

BRIEF DESCRIPTION OF THE DRAWINGS

FIG. 2 shows an example of a configuration of an application ability value database shown in FIG. 1;

DETAILED DESCRIPTION OF THE PREFERRED EMBODIMENTS

Hereinafter, the most exemplary embodiment that can be easily practiced by any person having ordinary knowledge in the technical field to which the present invention belongs will be described in more detail with reference to the accompanying drawings. This invention may, however, be embodied in different forms and should not be construed as limited to the embodiment set forth herein.

In a system for playing a golf game according to an embodiment of the present invention, a plurality of golf club sets having different characteristics are provided, and a user can play the golf game by selecting a golf club set according to his/her own ability. Here, the golf club sets are classified into a plurality of ability levels, for example, beginner, junior-amateur, amateur, junior-pro, semi-pro, pro, and master.

Meanwhile, an ability value assigned to each golf club set may include a request ability value that is referred to when a user requests to use the golf club set, and an application ability value that is applied to determine a movement direction, a flight distance, etc., of a ball shot with the golf club.

The user is provided with a predetermined number of points as a result of the game. The user can use a golf club when an ability value of the user that accumulates based on the points satisfies the request ability value assigned to that golf club. Since the application ability value varies with respect to the level of the golf club, for example, increases in proportion to the level, the user takes a more active part in the game in order to increase his/her own ability value so that he/she can use higher level golf clubs.

Here, parameters influenced by each of the ability values (the user's ability value, the application ability value, and the request ability value) may include, but are not limited to, power which affects a flight distance of a hit golf ball, swing safety and accuracy which affect a direction of the hit golf ball, and crisis management ability which affects success in coping with difficulty when the ball falls into a hazard such as a bunker, etc.

In this manner, in an embodiment of the present invention, the user is allowed to participate in the game in more depth by changing the user's ability value according to results of games, classifying the golf clubs that can be used according to the user's ability value, varying the application ability value assigned to each golf club, and increasing the user's selection of golf clubs. Accordingly, the enjoyment of the golf game can be enhanced.

The detailed structure and operation of a system for playing a golf game based on this concept, in accordance with an embodiment of the present invention, will now be described.

Figure 1:
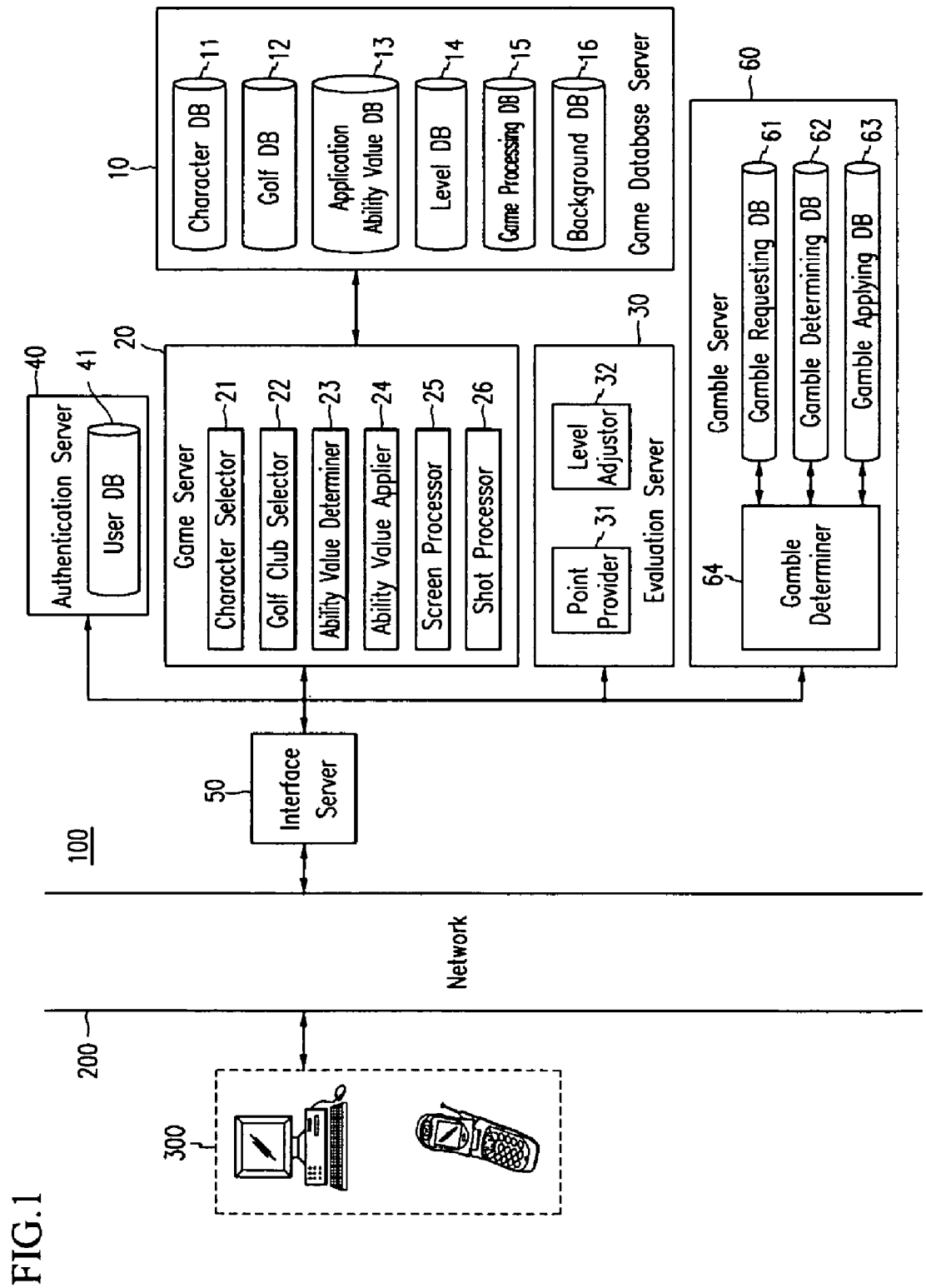
FIG. 1 shows a structure of golf game system according to an embodiment of the present invention.

The structure of the system for playing a golf game according to an embodiment of the present invention is shown in FIG. 1. A system 100 provides a golf game service to users through a network such as the Internet. The system 100 is connected to a plurality of user terminals 300 through a network 200 (which can be any of various types of networks such as a telephone network, the Internet, a wireless communication network, etc.).

Each of the user terminals 300 refers to communication equipment capable of providing access to the system 100 through the network 200. For example, the communication equipment may be a wired phone, a mobile communication terminal, a computer, or a television (TV) that can access the Internet, and so forth. Therefore, the user can conveniently and rapidly access the system 100 by using at least one of a PC communication network, the Internet, wireless Internet, a telephone network, and so on.

The system 100, which is connected to the user terminals 300 to provide the golf game service to the plurality of users, includes a game database server 10, a game server 20, an evaluation server 30, an authentication server 40, and an interface server 50.

The database server 10 includes a character database 11, a golf club database 12, an application ability value database 13, a level database 14, a game processing database 15, and a background database 16.

The character database 11 stores information on a plurality of groups of characters provided in the system according to an embodiment of the present invention. For example, the information may include a basic ability value and a description of the features of each character in each group. Here, the basic ability value allotted to each character may be different. In other words, values indicating power, swing safety, swing accuracy, and crisis management are allotted to each character and generally differ from character to character. For instance, a character1 may have ability value parameters characterized by a long flight distance and poor swing safety or accuracy. A character2 may have ability value parameters characterized by a short flight distance and good swing safety or accuracy. In this manner, users can enjoy the golf game while taking the role of any of the characters having different abilities.

The golf club database 12 stores information on golf clubs used for the golf game. The golf clubs are sorted into a driver, woods, irons, a pitching wedge, a sand wedge, a putter, and so on. These kinds of golf clubs constitute one "golf club set." The golf club sets may generally be sorted as follows: a first category where the flight distance takes priority over other parameters, a second category where the swing safety takes priority over other parameters, a third category where the swing accuracy takes priority over other parameters, and a fourth category where the crisis management ability takes priority over other parameters. The golf club database 12 includes a level of the golf club sets sorted into the categories, information on the golf clubs belonging to each golf club set, and the request ability value and the application ability value assigned to each golf club of each golf club set.

The application ability value database 13 stores information on values actually applied when the golf clubs are used according to their application ability values. A structure of the application ability value database 13 is shown in FIG. 2. As shown, the application ability value database 13, according to an embodiment of the present invention, includes a flight distance application table 131, a swing safety application table 132, a swing accuracy application table 133, and a crisis management application table 134.

The flight distance application table 131 includes the flight distance applied when each golf club is used according to each application ability value. The swing safety application table 132 includes a speed of a swing gauge and/or an angle at which the ball is hit according to each application ability value. The swing accuracy application table 133 includes a value at which a width of an impact zone is adjusted according to each golf club on the basis of each application ability value, i.e., a zone adjustment value. The crisis management application table 134 includes a length adjustment value of the swing gauge according to each application ability value, and an additional impact zone adjustment value. The additional impact zone adjustment value is for allowing the user to escape from hazards such as bunkers by additionally adjusting the impact zone adjusted according to the zone adjustment value on the basis of the crisis management ability.

Figure 3:
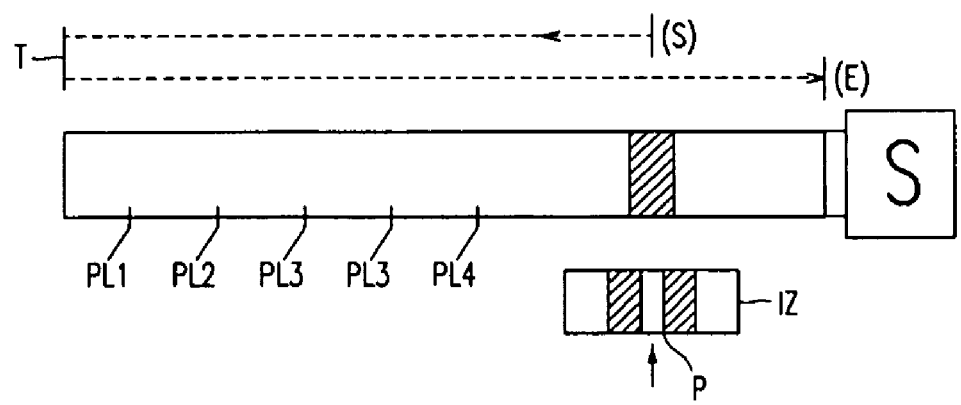
FIG. 3 illustrates a swing gauge displayed on a screen according to an embodiment of the present invention.

These application ability values vary the swing gauge which the user manipulates in order to play the game. The swing gauge is for adjusting the distance and direction of the ball shot by the user to thereby determine a position etc. at which the ball stops. For example, FIG. 3 illustrates a swing gauge displayed on a screen according to an embodiment of the present invention, in which the swing gauge is provided in a band form. However, it is understood that the swing gauge is but one example of this input parameter, which is manipulated by the user to play the golf shot.

As illustrated in FIG. 3, a swing gauge g is provided with an impact zone IZ for determining a direction and/or rotation of the ball traveling through the air based on swing accuracy, wherein the impact zone IZ is on the right side of FIG. 3. The impact zone IZ includes a timing point P indicating a best shot around the middle thereof. A zone adjustment value stored in the accuracy adjusting table adjusts the width of the impact zone, a position of the timing point, and so forth.

A scroll bar B on the gauge g begins to move from a start position S in a direction indicated by an arrow, arrives in the vicinity of the maximum left position T, and then returns to the impact zone IZ. At this time, when a signal generated by user manipulation is input after the scroll bar B begins to move, the position of the scroll bar B is instantaneously recorded. The distance the ball travels in the air from being shot (the flight distance) is determined according to the record position of the scroll bar B.

Next, when the user manipulation is carried out while the scroll bar B moves to the maximum left position T and then returns toward the start position S, the scroll bar B is stopped at a certain position. The direction and/or rotation of the traveling ball are determined according to the stop position of the scroll bar B. For example, the scroll bar B begins to move from the start position S according to a first user manipulation, a current position of the scroll bar B (hereinafter, referred to as a "record position") is recorded according to a second user manipulation, and the scroll bar B is stopped according to a third user manipulation.

Then, the shot is played according to the stop position of the scroll bar B, and the ball moves by the flight distance determined according to the record position of the scroll bar B, in a predetermined direction. In general, when the scroll bar B is stopped at the timing point P of the impact zone IZ, the result is the best shot. When the scroll bar is stopped within the impact zone IZ, the result is a normal shot. And, when the scroll bar is stopped beyond the impact zone IZ, the result is a failure to hit the ball at all.

Further, the flight distance may vary substantially according to the application ability value of the golf club and the record position of the scroll bar B. For example, when the record position of the scroll bar B is in the vicinity of the maximum left position T of the swing gauge in FIG. 3, the flight distance according to the ability value is applied at a rate of 100%. As the record position of the scroll bar B becomes farther removed from the vicinity of the maximum left position T, the rate at which the ability value is applied to determine the flight distance is correspondingly reduced. In FIG. 3, at each of positions PL1 to PL4, the rate at which the ability value is applied to determine the flight distance is different, but these positions are not always indicated on the swing gauge.

Meanwhile, the speed of the swing gauge of the swing safety application table 132 refers to the speed at which the scroll bar moves, and the length adjustment value of the swing gauge indicates the total length of the swing gauge.

The level database 14 stores information on the level and ability value for selecting a golf club according to user. For example, the information may include the ability value corresponding to an identification number of a character selected by a user, allotted ability points, level, etc. The user can play the game using at least one character, and the basic ability value allotted to a character becomes the user's ability value that is used to select golf clubs for that character.

The game processing database 15 stores information accumulated while the game is played. For example, the information may include the number of holes played by each user-specific character corresponding to the character's identification number, the number of strokes taken on each hole, the score, etc.

The background database 16 stores information on each golf course provided in the golf game service according to an embodiment of the present invention. The information may include data on where a tee, a hole, a green, a fairway, hazards (e.g. a bunker), rough, etc. are located, data that establishes a background (trees, hills, water, rocks, etc.), and so forth.

The game server 20 providing the golf game service to the users on the basis of the information stored in the game database server 10 includes a character selector 21, a golf club selector 22, an ability value determiner 23, an ability value applier 24, a screen processor 25, and a shot processor 26.

Figure 4:
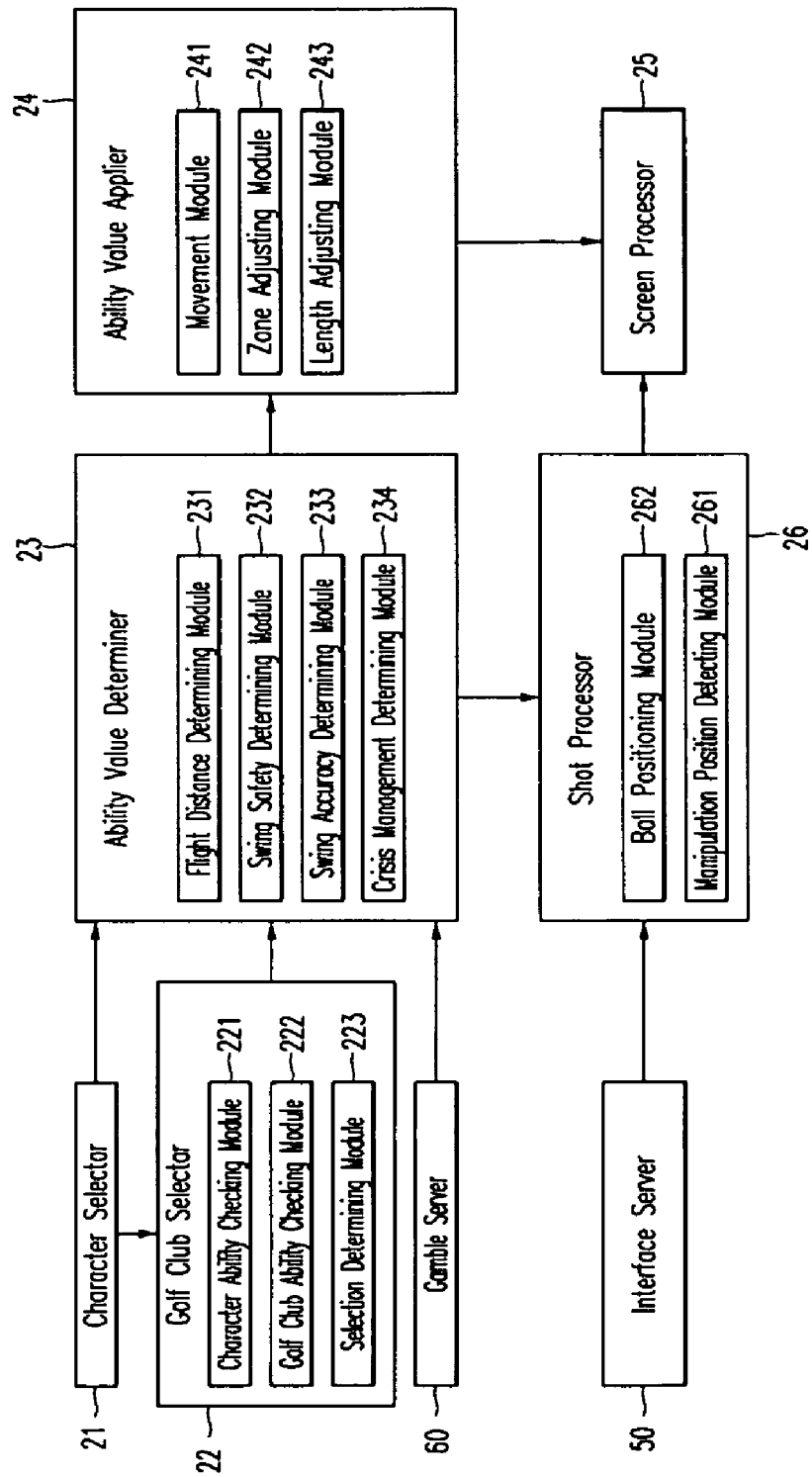
FIG. 4 shows a detailed structure of components shown in FIG. 1.

In FIG. 4, a detailed structure and correlation of components of the game server 20 are shown.

The character selector 21 provides information on the numerous characters which the system 100 provides to the user requesting the game. When the user selects any one of the characters, the character selector 21 sets the ability value of the character as the ability value of the user.

The golf club selector 22 provides a predetermined golf club set to the user according to both the ability value of the user and the request ability value allotted to each golf club set. To this end, as shown in FIG. 4, the golf club selector 22 includes a character ability checking module 221 for checking the ability value that is allotted to the character of the user, i.e., the user's ability value, a golf club ability checking module 222 for checking the request ability value allotted to the golf club set which the user selects, and a selection determining module 223 for comparing the user's ability value and the request ability value to determine whether the golf club set can be used by the user.

The ability value determiner 23 determines values that substantially adjust the swing gauge or flight distance according to the application ability value allotted to the golf club set which the user selects. To this end, the ability value determiner 23 includes a flight distance determining module 231, a safety determining module 232, an accuracy determining module 233, and a crisis management determining module 234, which determine a flight distance, a speed of the swing gauge and/or an angle at which the ball is hit, an impact zone adjustment value, a length adjustment value of the swing gauge, an additional impact zone adjustment value, etc., applied when each golf club is used, from the flight distance application table 131, the swing safety application table 132, the swing accuracy application table 133 and the crisis management application table 134, respectively.

The ability value applier 24 varies the swing gauge on the basis of the numerous adjustment values determined by the ability value determiner 23. To this end, the ability value applier 24 includes a movement module 241 for adjusting a movement speed of the scroll bar moving on the swing gauge according to the speed of the swing gauge, a zone adjusting module 242 for adjusting the width of the impact zone according to the impact zone adjustment value and the additional impact zone adjustment value, and a length adjusting module 243 for adjusting the total length of the swing gauge according to the length adjustment value of the swing gauge.

Meanwhile, the screen processor 25 reads and processes the corresponding data from the background database according to the golf course set by selection of the user, to thereby form a course and a background of the game screen, or displays a locus etc. of the movement of the ball or swing gauge according to a signal output from the ability value applier 24 or shot processor 26.

The shot processor 26 includes a manipulation position detecting module 261 for detecting the record and stop positions of the scroll bar of the swing gauge according to the user manipulation signal input through the interface server 50, and a ball positioning module 262 for moving the ball according to the detected positions and the flight distance determined by the ability value determiner 23. Meanwhile, the screen processor 25 displays, on a screen, the movement locus of the ball according to the ball's position set by the ball positioning module 262.

The evaluation server 30 checks the number of strokes that it takes for the user to finish each hole in the process of playing the golf game to yield a score, and stores the result in the game processing database 15. The evaluation server 30 provides the ability points for advancing in level to the user. In detail, the evaluation server 30 includes a point provider 31 for providing a predetermined number of ability points to the user as a result of the game, and a level adjuster 32 for increasing/decreasing the level, which enables adjustment of the ability value of the user on the basis of the accumulated ability points, and for providing an extra ability value for adjusting the ability value with respect to each level.

The authentication server 40 performs membership registration of the numerous users and authentication of the users getting access on the basis of the information stored in a user database 41. The user database 41 stores information on users to whom service can be provided through the system 100, according to a present embodiment of the present invention. For example, the information may include a password for login corresponding to identification assigned to the user (a user ID), a resident registration number (or social security number), a user name, a postal address, an e-mail address, a contact number (a mobile phone number or land line number, etc.), and so forth.

Meanwhile, in an embodiment of the present invention, a gamble service is provided to enhance the enjoyment of the game. The gamble service makes it possible to apply a larger ability value than the application ability value allotted to a selected golf club. When the user requests a gamble on a predetermined golf club, an additional value is added to the application ability value of the golf club if the gamble is successful.

A number of methods can be used to determine whether the gamble is won or not, but the present embodiment determines whether or not the user wins the gamble based on probability. In other words, when the user requests the gamble, win or loss is determined according to a preset win probability. In particular, in order to enable the user to more actively participate in the game, the win probability is adjusted according to the number of times the user has played the game. Thus, the win probability of the gamble may vary according to user. Here, the gamble may be individually performed for the flight distance, the swing safety, the swing accuracy, and the crisis management ability parameters of the ability value.

In order to provide this gamble service, the system for playing a golf game according to the embodiment of the present invention, as shown in FIG. 1, further comprises a gamble server 60. The gamble server 60 includes a gamble requesting database 61 for storing information on user-specific gamble requests, a gamble determining database 62 for storing information on a user-specific game participation count and the gamble win probability, a gamble applying database 63 for storing additional values that are applied to a parameter of each ability value on playing the gamble, and a gamble determiner 64 for determining whether or not the gamble is won. Meanwhile, the game participation count stored in the gamble determining database 62 may be used to represent a level indicating a game participation degree of the user, which is called "Tomas level" for convenience and is allotted to each user. The Tomas level is increased every time a user takes part in a game, regardless of the result of the game. Thus, the gamble win probability may be varied according to the Tomas level. The Tomas level is represented by the character which the user selects to play the game, so that other users can recognize the skill of the user.

Meanwhile, the ability value determiner 23 of the game server 20 additionally adjusts the flight distance, the speed of the swing gauge, the angle at which the ball is hit, the impact zone adjustment value, the length adjustment value of the swing gauge, or the additional impact zone adjustment value applied when each golf club is used according to information on the success or failure of the gamble reported by the gamble determiner 64.

The interface server 50 performs a function of permitting the plurality of user terminals 300 to gain access through the network 200 (particularly, the Internet or wireless Internet), a function of translating various information provided through the game server 20 to be compatible with a communication standard and providing the translated information to the plurality of user terminals 300, and a function of receiving information transmitted from the plurality of user terminals 300 through the network 200 and providing the received information to each of the servers 20, 30, 40, and 60. In particular, the interface server 50 receives a key signal (or mouse manipulation signal) input by user manipulation for the golf game and provides the received signal to the game server 20. The interface server 50 may include database inter-working equipment (e.g., a common gateway interface (CGI)) for transmitting and receiving information to and from a web server or other system.

In the above-described system for playing a golf game according to an embodiment of the present invention, the servers 10 to 60 are classified according to their functions. However, the servers are not restricted to such classification and may be modified in various ways within the scope of the present invention. For instance, the gamble or authentication server is implemented in such a manner that it includes the databases 41, 61, 62, and 63. In contrast, the game database server 10 may be implemented in such a manner that it includes all of the databases 41, 61, 62, and 63.

Further, each of the servers may selectively include its components, if necessary, with each component serving as an independent server to process corresponding functions. Further, the databases 11 to 16 are not restricted to being classified as described above.

An operation of the system for playing a golf game based on this structure in accordance with the embodiment of the present invention will now be described.

Figure 5:
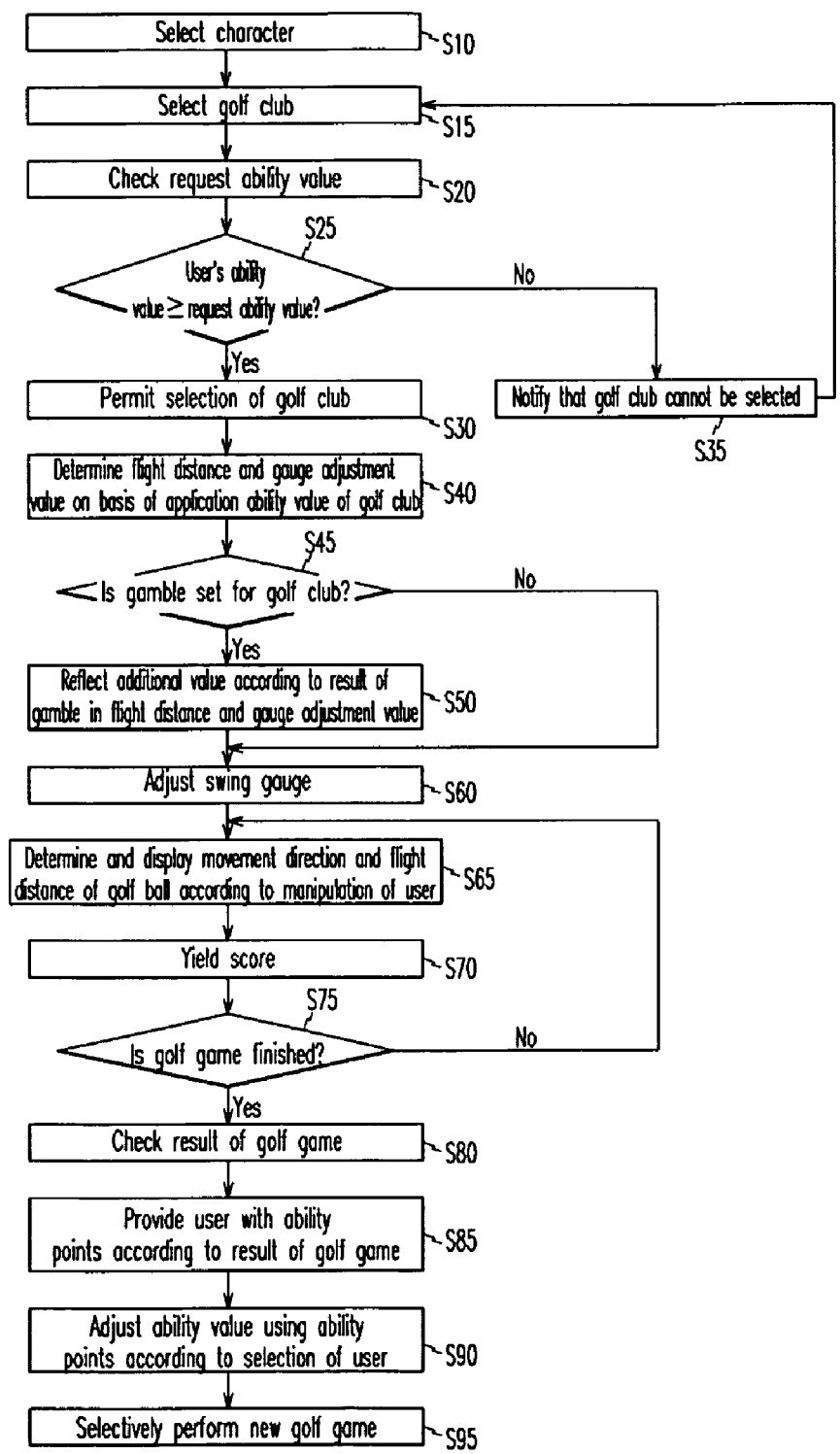
FIG. 5 is a flowchart showing a method for playing a golf game according to an embodiment of the present invention.

FIG. 5 schematically shows an overall operation for processing a golf game according to an embodiment of the present invention.

First, as shown in the attached FIG. 5, a user gaining access to the system 100 for playing a golf game through the network may play the golf game alone or together with one or more other users, and various game modes may be provided. After selecting a golf game mode, the user can select a character for the golf game. Further, the user can select any one of a plurality of golf courses.

When the character is selected, the character selector 21 reads the ability value corresponding to the selected character from the character database 11, sets the read ability value as the ability value of the user, stores the selected character corresponding to a user ID and the user's ability value in the level database 14, and selectively notifies the user of the ability value (S10). Here, a level of the user can be determined by the user's ability value.

Subsequently, the user selects a golf club set to use in the golf game (S15). The golf club selector 22 provides information on the plurality of golf club sets provided. On the basis of this information, the user selects a category of golf club sets for which, among the flight distance, the swing safety, the swing accuracy, and the crisis management ability, any one parameter takes priority over the other parameters. After selecting the golf club set category, the user selects one golf club set suitable for the user's ability value among the golf club sets belonging to the selected category.

The user can select a golf club set having any one of the levels. Then, the character ability checking module 221 of the golf club selector 22 checks the ability value of the character selected by the user, i.e., the user's ability value, and the golf club ability checking module 222 checks the request ability value allotted to the golf club set selected by the user from the golf club database 12 (S20). The selection determining module 223 of the golf club selector 22 compares the user's ability value and the request ability value. If the user's ability value exceeds the request ability value, the selection determining module 223 provides the selected golf club set to the user (S25 and S30).

At this time, the selection determining module 223 permits use of the golf club set either when the user's ability value parameters are greater than corresponding parameters of the request ability value of the golf club set, or when more than a preset number of the user's ability value parameters exceed corresponding parameters of the request ability value. In contrast, when the user's ability value is smaller than the request ability value, the selection determining module 223 notifies the user that the corresponding golf club set cannot be used and permits the user to select another golf club set (S35).

As mentioned above, when the user selects the golf club set and then one golf club from the selected golf club set, the ability value determiner 23 searches the flight distance application table 131, the swing safety application table 132, the swing accuracy application table 133, and the crisis management application table 134, on the basis of the application ability value applied to the selected golf club set, and finds the adjustment value of the swing gauge such as the flight distance, the speed of the swing gauge and/or the angle at which the ball is hit, the impact zone adjustment value, the length adjustment value of the swing gauge, the additional impact zone adjustment value, etc. applied when the selected golf club is used (S40). At this time, when the user requests the gamble on the flight distance, the swing safety, or the swing accuracy, the ability value determiner 23 additionally increases the flight distance or the adjustment value of the swing gauge on the basis of an additional value provided from the gamble applying database 63 of the gamble server 60 (S45 and S50).

After the flight distance or the adjustment value of the swing gauge is finally determined, the ability value applier 24 adjusts the swing gauge based on the determined ability value (S15 and S20). Specifically, the ability value applier 24 adjusts the movement speed of the scroll bar of the swing gauge on the basis of the adjustment value according to the swing safety parameter of the ability value, and adjusts the width of the impact zone on the basis of the adjustment value according to the swing accuracy. Further, the ability value applier 24 adjusts the length of the swing gauge on the basis of the adjustment value according to the crisis management ability (S60).

Then, when the user manipulates the swing gauge to play a shot, the shot processor 26 processes the golf game by moving the ball in a movement direction determined according to the manipulation of the swing gauge and by the flight distance according to the manipulation of the swing gauge and the basic ability value of the user (S65). Meanwhile, the evaluation server 30 yields a score of the golf game based on a position of the ball and the number of strokes taken by the user (S70).

Thereafter, when the game is finished, the point provider 31 of the evaluation server 30 determines win or loss of the game according to the final score of the user, and selectively endows the user with ability points capable of adjusting the ability value according to the user's win or loss of the golf game (S75, S80, and S85). Here, the ability points are provided to the user depending on win or loss of the golf game. However, the present invention is not restricted to this method of providing the ability points and may employ another method where the ability points are differentially allotted according to a score difference between users or a score of each user.

The user can request level advancement according to the ability points. At such a request, the level adjuster 32 varies the level for adjusting the ability value of the user, and gives the user extra ability value corresponding to the varied level. When the user requests adjustment of the ability value, the ability value determiner 23 adjusts the ability value of the user using the extra ability value allotted to the user (S90).

Thereafter, the user can play a new golf game using a golf club set of a higher level, according to the adjusted ability value (S95).

In this manner, the embodiment of the present invention can adjust the ability value exerting an influence upon a winning average of the golf game on the basis of the ability points allotted according to the result of the golf game.

Now, a gamble process in the golf game played as described above will be described.

Figure 6:
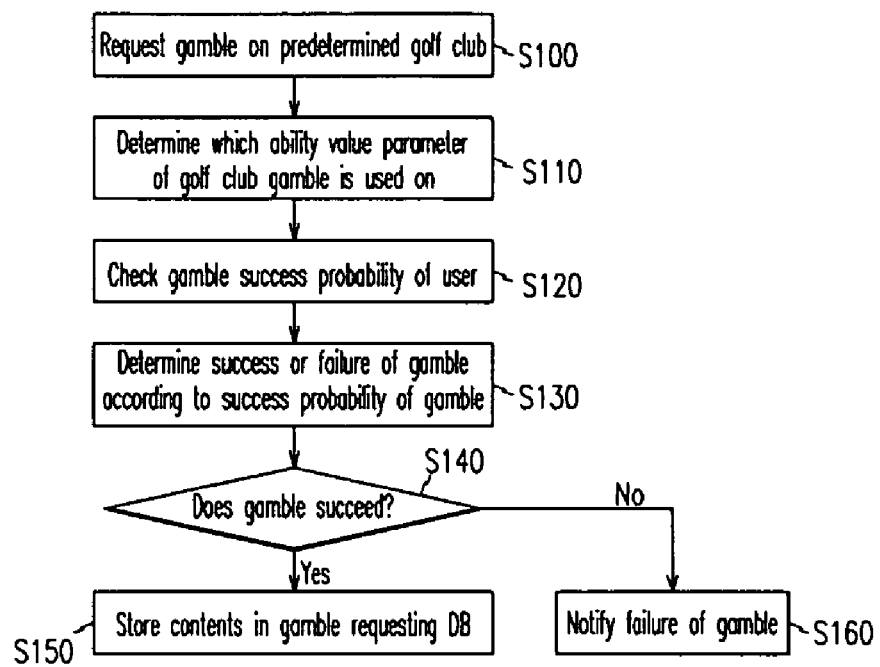
FIG. 6 is a flowchart sequentially showing a gamble process according to an embodiment of the present invention.

FIG. 6 is a flowchart of a gamble process in a golf game according to an embodiment of the present invention.

After selecting a golf course, a character, an ability value of the character, and a golf club set according to the character ability value, the user can request a gamble on a parameter of an ability value of a certain golf club in his/her selected golf club set. In other words, the user can individually request the gamble for increasing a basic parameter of an application ability value of the golf club corresponding to one of power, swing safety, swing accuracy, etc. (S100 and S110).

When the user requests the gamble, the gamble determiner 64 of the gamble server 60 retrieves the gamble determining database 62 based on a user ID to check how many times the user has taken part in the game, and then sets a gamble win probability based on the number of times the user has participated in the game (S120 and S130). In the present system, since the user can play the game using any of the plurality of characters, the number of times the user has participated in the game is not the number of times the user has participated in the game with a particular character, but the total number of times the user has participated in the game regardless of the character used.

Then, the gamble determiner 64 determines win or loss of the gamble currently requested by the user according to the set win probability. As a result of the determination, if the gamble is won, the gamble requesting database 61 stores the user ID, an ID of the selected golf club set, an ID of the golf club of the gamble, and ability value parameters of the gamble, and such information is adapted to be used in the golf game in the future (S140 and S150).

In step S140, when the gamble fails, the gamble determiner 64 notifies the user of the failure (S60). The gamble requesting database 61 may store the user ID, the ID of the selected golf club set, the ID of the golf club of the gamble, and ability value parameters of the gamble such that ability value parameters smaller than the basic application ability value parameters of the golf club for which the gamble failed are applied.

In addition, the user may request an over-power gamble on a flight distance of the golf club. The over-power gamble allows a ball to be shot once with the maximum power using the corresponding golf club. According to a preset value of an over-power count, the number of times for possible over-power is increased by one. Specifically, the number of times is increased according to the number of holes the user has played in the golf game and whether the over-power has been used or not. For instance, suppose that the over-power count is 3. If the user does not use the over-power until he/she moves from a first hole to a third hole, the number of times the over-power can be attempted is increased by +1 when the user moves from the third hole to a fourth hole. In this case, the gamble applying database 63 stores an additional value applied when the over-power is used according to each golf club.

When the user requests the over-power gamble, this request, i.e., that the over-power gamble is requested corresponding to the user ID and the golf club ID, is also recorded in the gamble requesting database.

Next, a process of determining a flight distance in the golf game played as mentioned above will be described in detail.

Figure 7:
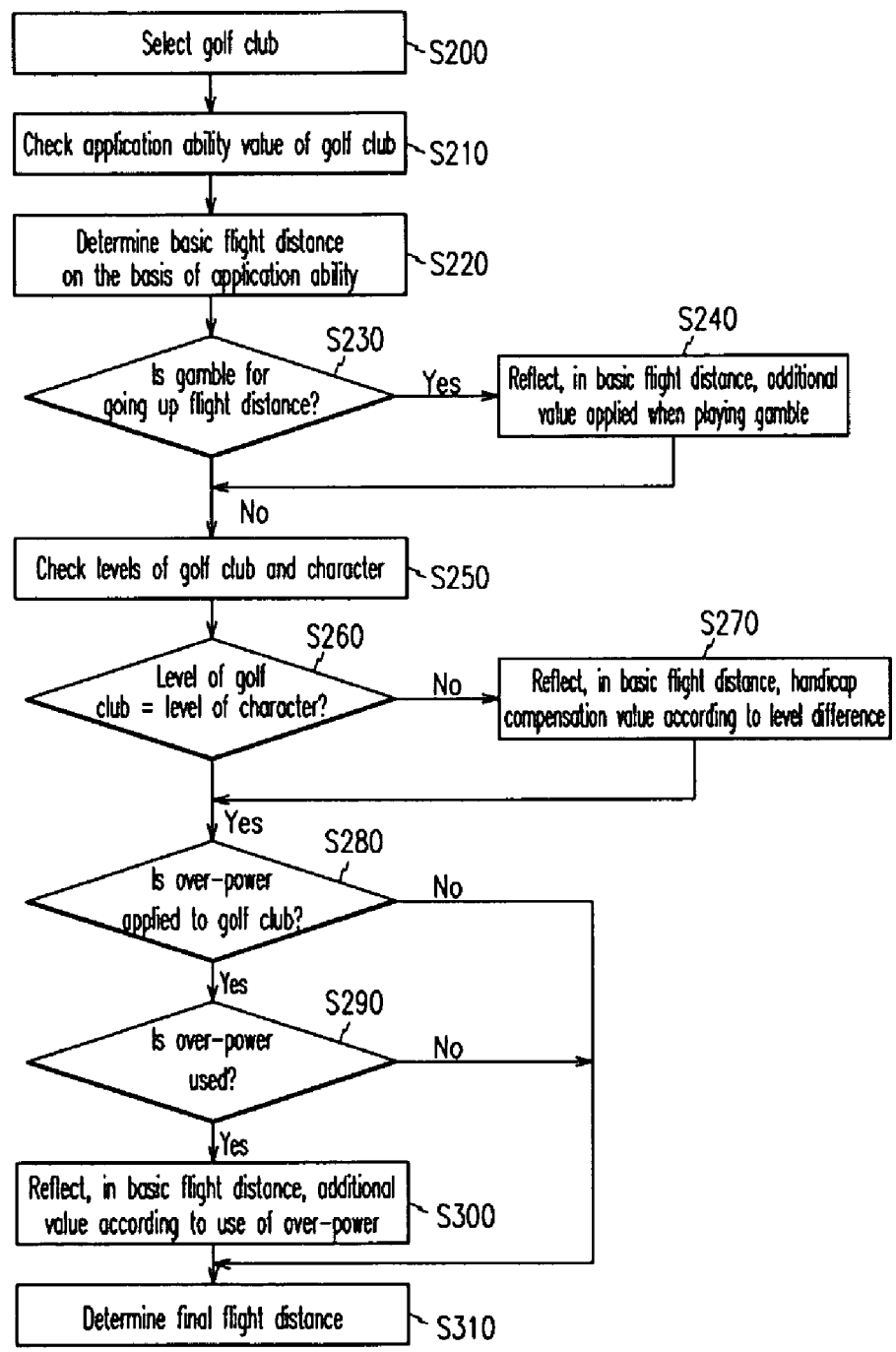
FIG. 7 is a flowchart showing a process of determining a flight distance in a golf game according to an embodiment of the present invention.

FIG. 7 is a flowchart showing a process of determining a flight distance in a golf game according to an embodiment of the present invention.

When a user selects a golf club to be used according to an ability value, the flight distance determining module 231 of the ability value determiner 23 of the game server 20 checks an application ability value allotted to a golf club set to which the golf club belongs from the golf club database 12, and finds a flight distance corresponding to the application ability value and the golf club from the flight distance application table 131 of the application ability value database 13 according to the application ability value (S200, S210 and S220). The found flight distance is called a "basic flight distance."

Then, the flight distance determining module 231 retrieves the gamble requesting database 61 to check whether the user requests a gamble on the flight distance of the golf club. If the gamble is requested, the flight distance determining module 231 reads an additional value applied according to the result of the gamble for each ability value parameter from the gamble applying database 63, and reflects the read additional value in the basic flight distance (S230 and S240). In this manner, the basic flight distance is selectively adjusted according to whether the gamble is requested, and a handicap compensation value is also allotted according to level relation between the user and the golf club.

The handicap compensation value is for compensating the flight distance caused by a level difference when a user of a high level uses a golf club of a low level. When the user has a different level from the golf club, for example, when an amateur-level user uses a beginner-level golf club, the compensation value is reflected in the basic flight distance according to the level difference such that the flight distance is different from when a beginner-level user uses a beginner-level golf club.

To this end, both the level of the golf club and a level of a character of the user are checked. If the golf club level does not match the character level, the compensation value caused by the level difference between the golf club level and the character level is reflected in the flight distance (S250, S260, and S270). This handicap compensation may be selectively performed.

Further, a process of additionally compensating the flight distance based on whether or not an over-power gamble on the golf club is requested and used may be further performed. The flight distance determining module 231 retrieves the gamble requesting database 61. As a result, when the over-power gamble on the golf club is requested and when the user wants to use the over-power (S280 and S290), the flight distance determining module 231 reads the additional value applied when the over-power is used for the golf club from the gamble applying database 63 to then reflect the read additional value in the basic flight distance, and determines a final flight distance (S300 and S310).

Therefore, when the user does not request the gamble or the over-power gamble on the golf club, and when the golf club is of the same level as the user, only the basic flight distance according to the application ability value allotted to the golf club set to which the golf club belongs is determined as the final flight distance (a). Further, when the user requests the gamble on the golf club, the sum of the additional value according to the gamble and the basic flight distance is determined as the final flight distance (b). In addition, when the user requests the gamble on the golf club and requests to use the over-power gamble, the sum of the additional value according to the gamble, the additional value according to the over-power gamble, and the basic flight distance is determined as the final flight distance (c). Here, in cases (b) and (c), when the user's level is different from the golf club level, the compensation value according to the handicap is additionally reflected in the final flight distance.

The final flight distance determined in this manner is used as data for determining a distance the ball travels when the user plays a shot.

Subsequently, a process of determining swing safety in the golf game played as mentioned above will be described in detail.

Figure 8:
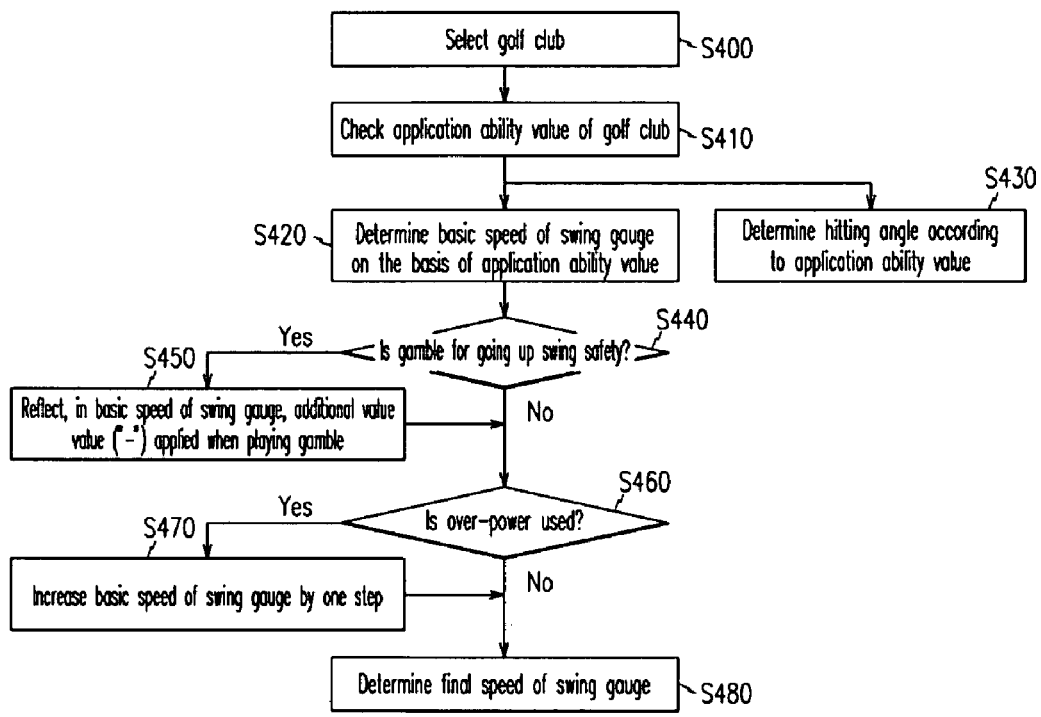
FIG. 8 is a flowchart showing a process of determining swing safety in a golf game according to an embodiment of the present invention.

FIG. 8 is a flowchart showing a process of determining swing safety in a golf game according to an embodiment of the present invention.

When a user selects a golf club to be used according to an ability value, the swing safety determining module 232 of the ability value determiner 23 first checks a swing safety parameter of an application ability value allotted to a golf club set to which the golf club belongs, then determines a basic speed of a swing gauge with reference to the swing safety application table 132 according to the application ability value, and determines an angle of impact (an angle at which the golf club hits the ball) (S400, S410, S420, and S430).

Meanwhile, because the user can request a gamble on the swing safety of the golf club, the swing safety determining module 232 checks whether or not the user requests the gamble on the swing safety of the golf club with reference to the gamble requesting database 61. If the gamble is requested, the swing safety determining module 232 reads an additional value applied when the gamble is played according to each ability value parameter (the swing safety) from the gamble applying database 63 and reflects the read additional value in the basic speed of the swing gauge (wherein the additional value is negative ("−") when the gamble is won because the speed of the swing gauge should be decreased in order to enhance swing safety) (S440 and S450). Thus, when the gamble is requested and won, the basic speed of the swing gauge is decreased according to the additional value.

Further, when the user requests an over-power gamble on the golf club and makes use of the over-power, a flight distance is increased to the maximum extent. In this case, in order to relatively lower the swing safety, the speed of the swing gauge is increased by one step depending on whether the over-power is used or not (S460 and S470).

Thus, when the user does not request the gamble on the swing safety of the golf club and does not use the over-power, the basic speed of the swing gauge according to the swing safety parameter of the application ability value allotted to the golf club set to which the golf club belongs is determined as a final speed of the swing gauge. Further, when the user requests only the gamble on the swing safety of the golf club, the sum of the additional value according to the gamble and the basic speed of the swing gauge is determined as the final speed of the swing gauge. In addition, when the user requests the gamble on the swing safety of the golf club and requests to use the over-power gamble, the sum of the additional value according to the gamble, the additional value according to the over-power gamble, and the basic speed of the swing gauge is determined as the final speed of the swing gauge (S480).

According to the final speed of the swing gauge determined in this manner, the ability value applier 24 adjusts the swing gauge.

Next, a process of determining swing accuracy in the golf game played as mentioned above will be described in detail.

Figure 9:
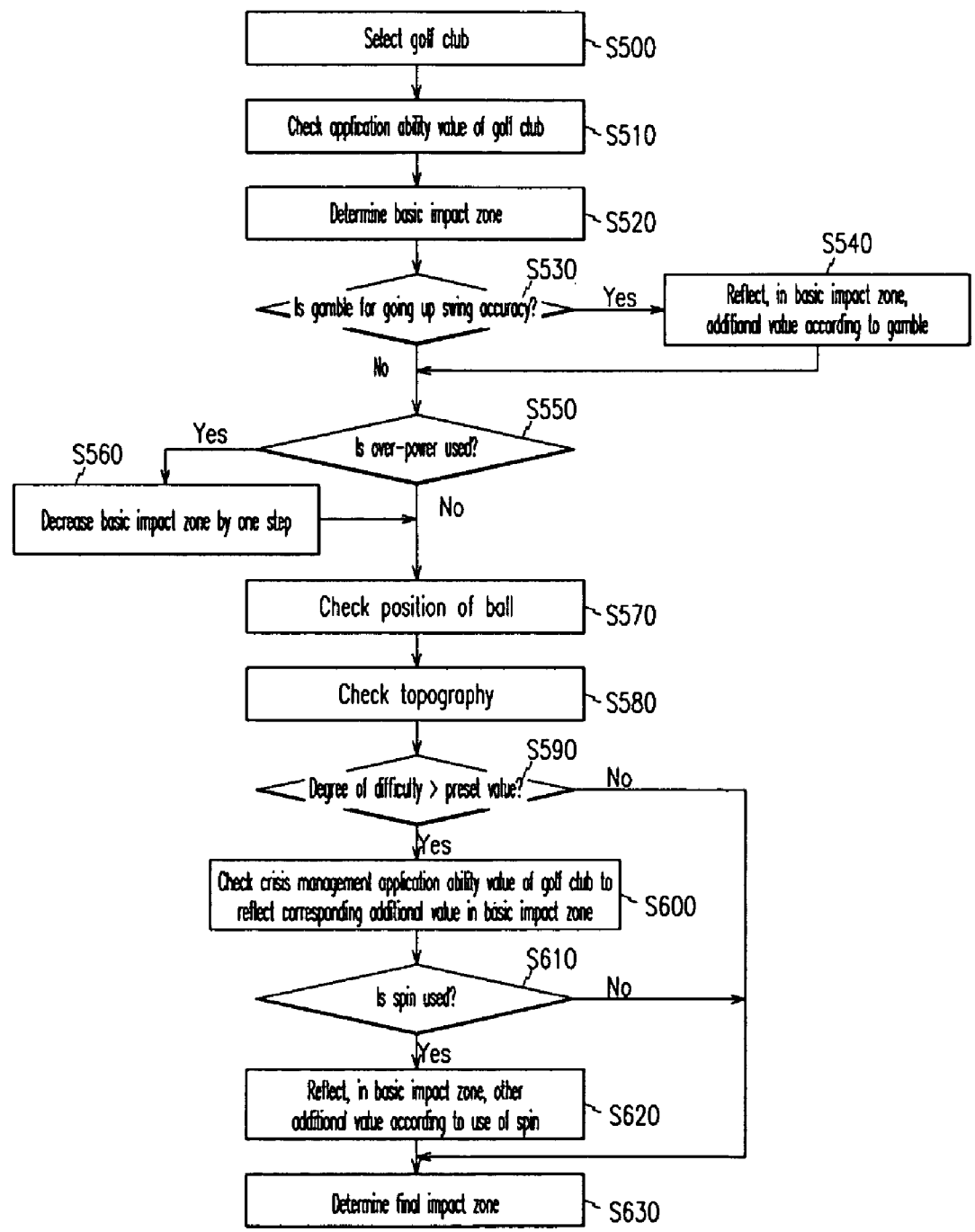
FIG. 9 is a flowchart showing a process of determining swing accuracy in a golf game according to an embodiment of the present invention.

FIG. 9 is a flowchart showing a process of determining swing accuracy in a golf game according to an embodiment of the present invention.

When a user selects a golf club to be used according to an ability value, the swing accuracy determining module 233 of the ability value determiner 23 first checks a swing accuracy parameter of an application ability value allotted to a golf club set to which the golf club belongs, and determines a basic impact zone (an impact zone adjustment value) with reference to the swing accuracy application table 132 according to the application ability value and the type of the golf club (S500, S510, and S520).

Meanwhile, because the user can request a gamble on the swing accuracy of the golf club, the flight distance determining module 231 checks whether or not the user requests the gamble on the swing accuracy of the golf club with reference to the gamble requesting database 61. If the gamble is requested, the flight distance determining module 231 reads an additional value applied when the gamble is used for each ability value parameter (the swing accuracy), from the gamble applying database 63, and reflects the read additional value in the basic impact zone (wherein the additional value is positive ("+") when the gamble is won because a width of the impact zone should be increased in order to enhance swing accuracy) (S530 and S540).

Further, when the user requests an over-power gamble on the golf club and makes use of the over-power, a flight distance is increased to the maximum extent. In this case, in order to relatively lower the swing accuracy, the impact zone adjustment value is decreased by one step depending on whether the over-power is used or not, and the width of the impact zone is narrowed (S550 and S560).

Meanwhile, in an embodiment of the present invention, in order to adjust the width of the impact zone according to topography at a current position of the ball, the ability value determiner 23 checks the topography of the current golf course where the ball is located. If a degree of difficulty according to the topography exceeds a preset value, the ability value determiner 23 adjusts the impact zone according to the position. In other words, the ability value determiner 23 reads an additional impact zone adjustment value according to the position of the ball from the crisis management application table 134, and then reflects the additional impact zone adjustment value in the basic impact zone adjustment value (S570, S580, S590, and S600).

Further, the impact zone can be additionally adjusted according to whether the user puts a spin on the ball or not. When the user uses the spin, the corresponding adjustment value is read from a spin application table (not shown) according to the direction of the spin for the corresponding golf club, and is additionally reflected in the basic impact zone adjustment value. In this case, when the user uses a left-handed spin, the width of the impact zone corresponding to the left side of a timing point of the impact zone is varied. Conversely, when the user uses a right-handed spin, the width of the impact zone corresponding to the right side of the timing point of the impact zone is varied (S610 and S620).

Thus, when the user does not request the gamble on the swing accuracy of the golf club, the user does not use the over-power, a degree of difficulty according to the current position of the ball is smaller than the preset value, and the user does not use spin, the basic impact zone according to the swing accuracy parameter of the application ability value allotted to the golf club set to which the golf club belongs is determined as a final impact zone. According to whether or not the gamble is used, whether or not the over-power is used, the degree of difficulty, and whether or not the spin is used, additional adjustment values generated according to each situation may be reflected in the basic impact zone to determine the final impact zone (S630).

According to the final impact zone determined in this manner, the ability value applier 24 adjusts the width of the impact zone.

Meanwhile, with regard to a crisis management parameter of the ability value, the ability value applier 24 adjusts a length of the swing gauge and additionally adjusts the impact zone on the basis of the basic length of the swing gauge or the additional impact zone adjustment value that are read from the crisis management application table 134 according to the crisis management parameter of the application ability value allotted to the golf club set to which the golf club belongs. Further, when the user requests the gamble on the crisis management parameter of the golf club, the additional adjustment value is reflected in the basic length of the swing gauge or the additional impact zone adjustment value according to the result of the gamble.

Subsequently, a process of playing a shot by substantially applying the flight distance, the speed of the swing gauge, the impact zone adjustment value, the length of the swing gauge, etc. that are finally determined as mentioned above will be described.

Figure 10:
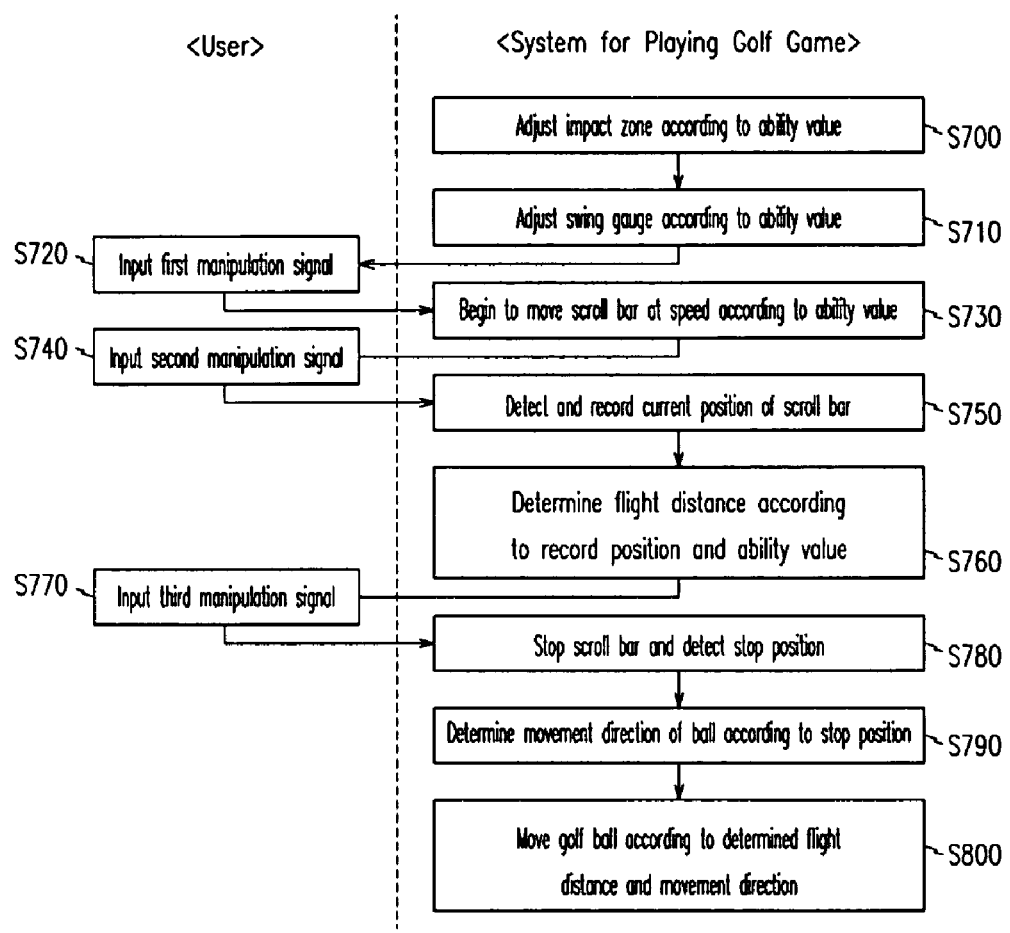
FIG. 10 is a flowchart showing a process of applying an ability value according to an embodiment of the present invention.

FIG. 10 shows a process of applying an ability value according to an embodiment of the present invention.

Figure 11:
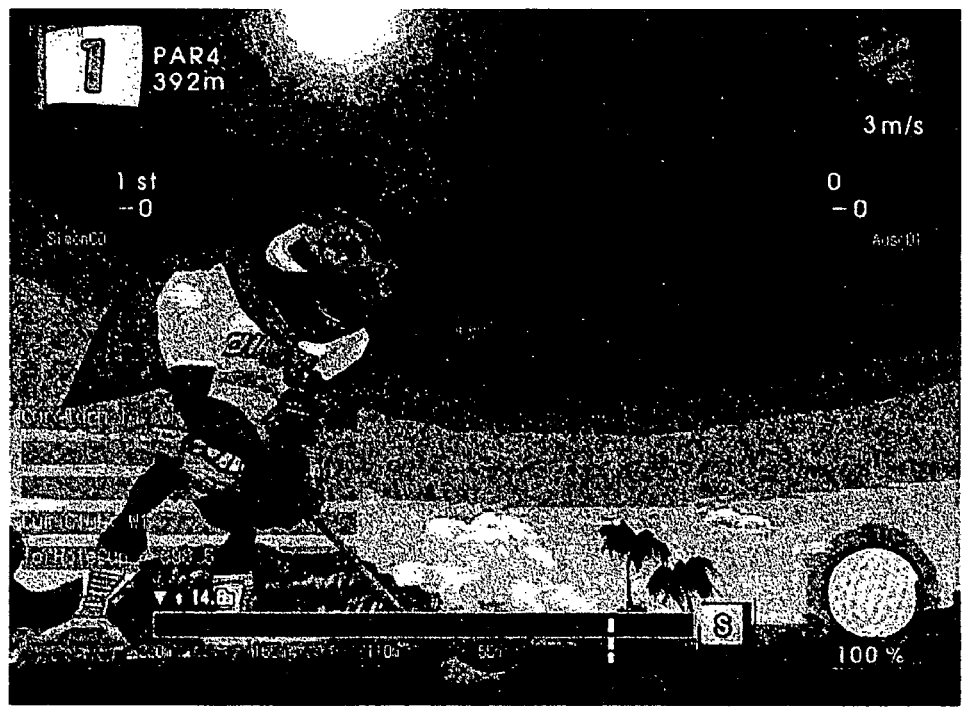
FIG. 11 illustrates a screen for playing a golf game according to an embodiment of the present invention.

First, the zone adjusting module 242 of the ability value applier 24 adjusts the width of the impact zone on the swing gauge based on the impact zone adjustment value that is finally determined by the ability value determiner 23, and the length adjusting module 243 adjusts the length of the swing gauge based on the length of the swing gauge that is finally determined (S700 and S710). In FIG. 11, a screen on which the swing gauge adjusted in this manner is displayed is illustrated.

In this manner, the swing gauge is adjusted according to an application ability value of a golf club. Then, when the user selects a desired golf club and inputs a first manipulation signal for a shot, the movement module 241 of the ability value applier 24 begins to move a scroll bar of the swing gauge from a start position at a final speed of the swing gauge according to swing safety of the golf club (S720 and S730). Subsequently, when the user inputs a second manipulation signal, the manipulation position detecting module 261 detects a position (record position) of the scroll bar at the exact time when the second manipulation signal is input (S740 and S750). Thus, the ball positioning module 262 of the shot processor 26 finally determines a flight distance the ball is to actually travel, according to the record position and the final flight distance determined by the ability value determiner 23 (S760). For example, assuming that the flight distance determined by the application ability value of the golf club is 100 meters, the flight distance is set to 100 when the record position corresponds to 100%, and is set to 50 when the record position corresponds to 50%.

Next, when the user inputs a third manipulation signal, the moving scroll bar is stopped. The manipulation position detecting module 261 detects a stop position of the scroll bar (S770 and S780). The ball positioning module 262 moves the ball by the flight distance determined finally by the ability value determiner 23, in a direction based on the detected stop position. A movement locus along which the ball travels is displayed by the screen processor 25, and the ball moves by the flight distance in the determined direction and then comes to a stop (S790 and S800).

After the golf game performed as described above is finished, the ability points can be allotted to the user according to the result of the golf game. Thus, the user individually increases the flight distance, the swing safety, the swing accuracy, the crisis management ability, etc. that are the parameters of his/her own ability value by using the allotted ability points. Thereby, according to the circumstances, the user can play the golf game by selecting one of a golf club set in which the flight distance takes priority over other parameters, a golf club set for which swing safety takes priority over other parameters, a golf club set for which swing accuracy takes priority over other parameters, and a golf club set in which crisis management ability takes priority over other parameters. After increasing his/her own ability value parameters using the ability points, the user takes a more active part in the golf game so as to accrue more ability points to further improve power, swing safety, accuracy, and crisis management ability.

Figure 12:
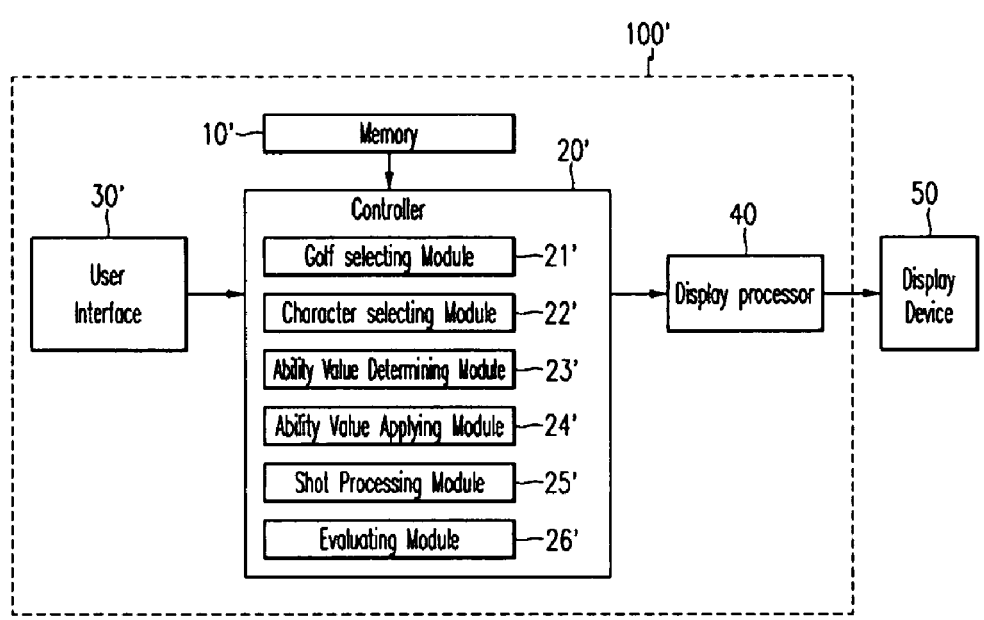
FIG. 12 illustrates a structure of a system for playing a golf game according to another embodiment of the present invention.

The above embodiments have been described with reference to a golf game played over a network (the online golf game). However, the system and method for playing a golf game according to the above embodiments of the present invention may be applied to an offline golf game as well. FIG. 12 illustrates the structure of a system for playing an offline golf game according to another embodiment of the present invention.

As illustrated in FIG. 12, a system for playing the offline golf game according to an embodiment of the present invention may include a user interface 30' for interfacing with a user, a controller 20' for performing the golf game according to a signal input from the user interface 30', a memory 10' for storing a program for the golf game and data related to golf game processing, and a display processor 40 for displaying golf game processing contents on a display device 50 according to control of the controller 20'. Here, the data stored in the database server 10 according to the above-described embodiment may be stored in the memory 10'. The controller 20' selectively includes the components of the game server 20, the evaluation server 30, and the gamble server 40 according to the above-described embodiment, and can process the golf game. It will be understood by those skilled in the art that the system for playing the offline golf game can be embodied to operate in the same manner as in the above-described embodiment, and so a detailed description of the operation of the system for playing the offline golf game will be omitted.

Further, the above-described methods for playing the golf game may be implemented in the form of a program stored in a recording medium that a computer can read. The recording medium may be any kind of medium in which data can be stored and read by a computer, for example, a CD-ROM, magnetic tape, a floppy disc, and so forth, as well as a medium implemented in the form of carrier waves, e.g., transmission over the Internet.

While the present invention has been described with reference to practical and exemplary embodiments, it will be understood by those skilled in the art that the invention is not limited to the disclosed embodiments but, on the contrary, is intended to cover various modifications and equivalents included within the spirit and scope of the appended claims.

According to the embodiments of the present invention as set forth above, the user can adjust the ability value exerting an influence upon the winning average of the golf game using the ability points allotted according to the result of the golf game, thereby enhancing the fun of the golf game.

What is claimed is:

1. A method of playing a virtual golf game, wherein a player of the golf game is provided a set of golf clubs, wherein each golf club set is classified with a request ability value that indicates a non-monetary ability value needed by the player, and wherein each golf club set is assigned an application ability value that indicates characteristics of golf shots by the golf clubs in the golf club set, the method comprising:
    allotting a non-monetary, ability value to a player of the golf game, wherein at least one attribute of the player's skill in playing the virtual golf game is based on the allotted non-monetary ability value;
    receiving a request for a golf club of the set of golf clubs;
    selectively allowing the player to use the requested golf club set based on whether the non-monetary, ability value allotted to the player is equal to or higher than the request ability value of the requested golf club;
    determining an adjustment value according to the application ability value associated with the golf club set;
    adjusting an input parameter according to the adjustment value; and
    determining a flight distance and location of a golf ball in response to receiving an input corresponding to the adjusted input parameter such that:
    (1) when neither a gamble nor an over-power gamble on a golf club is requested, the flight distance is computed according to the application ability value associated with the golf club, (2) when a gamble on the golf club is requested, the flight distance is determined based on a sum of a basic flight distance and an additional value according to the result of the gamble, (3) when both a gamble and an over-power gamble are requested, the flight distance is determined based on a sum of a basic flight distance, an additional value according to the result of the gamble, and another additional value that is based on success of the over-power gamble, and (4) upon checking a level of the player and a level of the golf club and when the player's level does not match the golf club level, the flight distance is determined based on applying a compensation value that corresponds to the difference in the player's level and the level of the golf club.

2. The method of claim 1, further comprising:
assessing performance of the player; and
selectively allotting ability points to the player that affect the player's non-monetary ability value based on the assessed performance.

3. The method of claim 1, wherein each of the ability value, the request ability value, and the application ability value comprises at least one of power adjusting the flight distance of the ball, swing safety, swing accuracy of the shot, and crisis management ability.

4. The method of claim 1, wherein adjusting easiness of hitting a golf ball comprises adjusting a user interface for the player to react to and configured to vary a portion thereon wherein the user interface comprises a swing gauge.

5. The method of claim 4, wherein:
the swing gauge comprises an impact zone indicating a direction for hitting the ball toward a hole, and a scroll bar moving within the swing gauge; and
adjusting easiness of hitting a golf ball further comprises at least one of:
computing a flight distance value according to the application ability value allotted to the selected golf club;
computing a movement speed value for the swing gauge according to the application ability value allotted to the selected golf club;
adjusting a width of the impact zone of the swing gauge according to the application ability value allotted to the selected golf club; and
adjusting a length of the swing gauge according to the application ability value allotted to the selected golf club.

6. The method of claim 5, wherein, when neither a gamble on a swing safety nor an over-power gamble is requested, computing a speed of the swing gauge according to the application ability value associated with the golf club to which the golf club belongs;
when the gamble on the swing safety is requested, computing the sum of the speed of the swing gauge and an additional value according to the result of the gamble; and
when both the gamble on the swing safety and the over-power gamble are requested, computing the sum of the speed of the swing gauge, the additional value according to the result of the gamble, and an additional value from the success of the over-power gamble.

7. The method of claim 5, wherein, when neither a gamble on a swing accuracy nor an over-power gamble is requested, computing an impact zone according to the application ability value associated with the golf club to which the golf club belongs; and computing an impact zone with an additional adjustment value according to whether the gamble on the golf club or whether over-power is requested.

8. The method of claim 7, further comprising calculating a degree of difficulty based on, at least in part, the topography of the location of the ball; and
when the degree of difficulty exceeds a preset value, computing the impact zone with an additional impact zone adjustment value.

9. The method of claim 7, further comprising detecting a spin on the ball; and
when detecting a spin on the ball, computing the impact zone with an additional adjustment value.

10. The method of claim 1, which further comprises
receiving a gamble request, and determining if the golf player wins the gamble, and
if the golf player wins, allotting an additional value to the allotted application ability value for the selected golf club.

11. The method of claim 10, wherein a success probability of the gamble varies according to the number of times a player has played the game.

12. The method of claim 1, which further comprises
receiving an over-power gamble request on the selected golf club and recording the over-power gamble request; and
computing the adjustment value on the basis of an additional value from a successful over-power gamble according to the application ability value of the golf club.

13. The method of claim 12, wherein the over-power is available once, and when the over-power is not used on a hole, the number of times the over-power is available increases.

14. A system for playing a golf game, the system comprising:
a database configured to store a non-monetary, ability value of a golf player representing at least one attribute thereof, a request ability value for each of a plurality of golf clubs, and an application ability value to be applied when using a golf club;
a golf club selector configured to allow selection of a golf club only when the non-monetary, ability value of the golf player is equal to or higher than the request ability value;
a determiner configured to determine an adjustment value according to the ability value of the golf player and further according to the application ability value of the golf club;
an ability value applier configured to adjust a swing gauge according to the adjustment value; and
a shot processor configured to calculate a ball trajectory, when the swing gauge is manipulated in response to a player input and determine a flight distance and location of a golf ball in response to receiving the player input such that:
(1) when neither a gamble nor an over-power gamble on a golf club is requested, the flight distance is computed according to the application ability value associated with the golf club,
(2) when a gamble on the golf club is requested, the flight distance is determined based on a sum of a basic flight distance and an additional value according to the result of the gamble,
(3) when both a amble and an over-power gamble are requested, the flight distance is determined based on a sum of a basic flight distance, an additional value according to the result of the gamble, and another additional value that is based on success of the over-power gamble, and (4) upon checking a level of the player and a level of the golf club and when the layer's level does not match the golf club level, the flight distance is determined based on applying a compensation value that corresponds to the difference in the player's level and the level of the golf club.

15. The system of claim 14, wherein the determiner further comprises:

a flight distance computing module configured to determine a flight distance for the shot based on, at least in part, the application ability value of the golf club;

a swing safety computing module configured to determine a movement speed of the swing gauge based on, at least in part, the application ability value of the golf club;

a swing accuracy computing module configured to adjust a width of an impact zone of the swing gauge based on, at least in part, the application ability value of the golf club; and a crisis management computing module configured to adjust a length of the swing gauge based on, at least in part, the application ability value of the golf club.

16. The system of claim 14, further comprising:

a gamble determining database configured to store the number of times the player takes part in the golf game and a success probability which determines success or failure for a gamble;

a gamble applying database configured to store an additional value applied to each application ability value parameter when the gamble is successful;

a gamble determiner configured to determine success of the gamble on the basis of the gamble success probability in response to a gamble request; and a gamble requesting database configured to store the identification number of a golf club and a record of success in the gamble.

17. The system of claim 14, further comprising:

a point provider configure to yield a score according to a position of the ball and the number of strokes, and to allot ability points on the basis of a result of the golf game according to the score; and a level adjustor configured to vary a level for adjusting the ability value according to the ability points.

18. The system of claim 14, wherein the system is connected with at least one user terminal over a network and provides a golf game service to the at least one user terminal.

19. A storage medium configured to store instructions, that are executed by a computer, to perform a method of playing a virtual golf game, wherein player of the golf game is provided a set of golf clubs, wherein each golf club set is classified with a request ability value that indicates a non-monetary ability value needed by the player, and wherein each golf club set is assigned an application ability value that indicates characteristics of golf shots by the golf clubs in the golf club set, the medium comprising:

program code for allotting a non-monetary, ability value to a player of the golf game, wherein at least one attribute of the player's skill in playing the virtual golf game is based on the allotted ability value;

program code for receiving a request for a golf club of the set of golf clubs;

program code for selectively allowing the player to use the requested golf club set based on whether the non-monetary, ability value allotted to the player is equal to or higher than the request ability value of the requested golf club;

program code for determining an adjustment value according to the application ability value associated with the golf club set;

program code for adjusting a swing gauge according to the adjustment value;

program code for determining a flight distance and location of a golf ball in response to receiving an input from the player such that:

(1) when neither a gamble nor an over-power gamble on a golf club is requested, the flight distance is computed according to the application ability value associated with the golf club, (2) when a gamble on the golf club is requested, the flight distance is determined based on a sum of a basic flight distance and an additional value according to the result of the gamble, (3) when both a gamble and an over-power gamble are requested, the flight distance is determined based on a sum bf a basic flight distance, an additional value according to the result of the gamble, and another additional value that is based on success of the over-power gamble, and (4) upon checking a level of the player and a level of the golf club and when the player's level does not match the golf club level, the flight distance is determined based on applying a compensation value that corresponds to the difference in the player's level and the level of the golf club; and program code for moving the golf ball in the movement direction determined according to a manipulation of the swing gauge and on the basis of the flight distance according to the ability value of the player.

* * * * *

UNITED STATES PATENT AND TRADEMARK OFFICE
CERTIFICATE OF CORRECTION

PATENT NO.        : 7,549,918 B2                                         Page 1 of 1
APPLICATION NO.   : 11/514415
DATED             : June 23, 2009
INVENTOR(S)       : Kang et al.

It is certified that error appears in the above-identified patent and that said Letters Patent is hereby corrected as shown below:

On the title page, item [56]:

In the left column of Page 2, Line 3 of Other Publications, please change "Game FAQs "Tiger Woods PGA Tour 2003 (XBOX)" to -- "Tiger Woods PGA Tour 2003 --.

In the right column of Page 2, Line 7, please change "WOods" to -- Woods --.

In Column 5, Line 21, after "gauge" delete "g".

In Column 5, Line 29, after "gauge" delete "g".

In Column 17, Line 3 of Claim 4, please change "thereon" to -- thereof, --.

In Column 18, Line 31 of Claim 14, please change "amble" to -- gamble --.

In Column 19, Line 5, please change "layer's" to -- player's --.

In Column 19, Line 3 of Claim 19, please change "wherein" to -- wherein a --.

In Column 20, Line 36, please change "bf" to -- of --.

Signed and Sealed this

Twenty-seventh Day of July, 2010

David J. Kappos
*Director of the United States Patent and Trademark Office*